US012585418B2

(12) United States Patent
Fujimaki et al.

(10) Patent No.: US 12,585,418 B2
(45) Date of Patent: Mar. 24, 2026

(54) HOST DEVICE AND INPUT-OUTPUT SYSTEM

(71) Applicant: Wacom Co., Ltd., Saitama (JP)

(72) Inventors: Hideki Fujimaki, Saitama (JP);
Tsukasa Nomi, Saitama (JP); Akira Ito, Saitama (JP); Tatsunori Kato, Saitama (JP)

(73) Assignee: Wacom Co., Ltd., Saitama (JP)

( * ) Notice: Subject to any disclaimer, the term of this patent is extended or adjusted under 35 U.S.C. 154(b) by 160 days.

(21) Appl. No.: 18/495,395

(22) Filed: Oct. 26, 2023

(65) Prior Publication Data

US 2024/0053945 A1      Feb. 15, 2024

Related U.S. Application Data

(63) Continuation of application No. PCT/JP2021/017873, filed on May 11, 2021.

(51) Int. Cl.
| | |
|---|---|
| *G06F 3/0486* | (2013.01) |
| *G06F 3/14* | (2006.01) |
| *G06F 3/147* | (2006.01) |

(52) U.S. Cl.
CPC .......... *G06F 3/1454* (2013.01); *G06F 3/0486* (2013.01); *G06F 3/147* (2013.01)

(58) Field of Classification Search
CPC .. G06F 3/0486; G06F 3/04842; G06F 3/0482; G06F 3/147; G06F 3/1423; G06F 2203/04803
See application file for complete search history.

(56) References Cited

U.S. PATENT DOCUMENTS

| | | | |
|---|---|---|---|
| 2005/0044384 A1 | 2/2005 | Kimura | |
| 2014/0173455 A1* | 6/2014 | Shimizu | H04L 67/06 |
| | | | 709/219 |
| 2015/0054852 A1* | 2/2015 | Ohnuma | H04L 12/6418 |
| | | | 345/635 |
| 2015/0281341 A1 | 10/2015 | Cadou | |
| 2016/0313965 A1* | 10/2016 | Chang | G06F 3/0486 |

(Continued)

FOREIGN PATENT DOCUMENTS

| | | |
|---|---|---|
| JP | 2005049993 A | 2/2005 |
| JP | 2007221362 A | 8/2007 |

(Continued)

OTHER PUBLICATIONS

International Search Report dated Jul. 6, 2021, for the corresponding International Patent Application No. PCT/JP2021/017873, 3 pages.

*Primary Examiner* — Jeanette J Parker

(74) *Attorney, Agent, or Firm* — Seed Intellectual Property Law Group LLP

(57) ABSTRACT

Disclosed is a host device including a display device that, in operation, displays an image in a host display region, a communication device that, in operation, communicates with multiple guest devices each having a display function, and a processor that, in operation, divides the host display region into at least two sub-regions and controls the display device to display at least two images currently displayed by at least two of the guest devices simultaneously connected to the host device, such that the at least two images are respectively displayed in corresponding ones of the at least two sub-regions.

6 Claims, 12 Drawing Sheets

(56)            References Cited

U.S. PATENT DOCUMENTS

2017/0262250 A1* 9/2017 Tanabe ................... G09G 3/001
2021/0034562 A1   2/2021 Kawamata et al.

FOREIGN PATENT DOCUMENTS

JP        2014120859 A    6/2014
JP        2015537280 A   12/2015
JP        2016115191 A    6/2016
JP        2020144725 A    9/2020
JP        2021022309 A    2/2021

* cited by examiner

F I G . 2
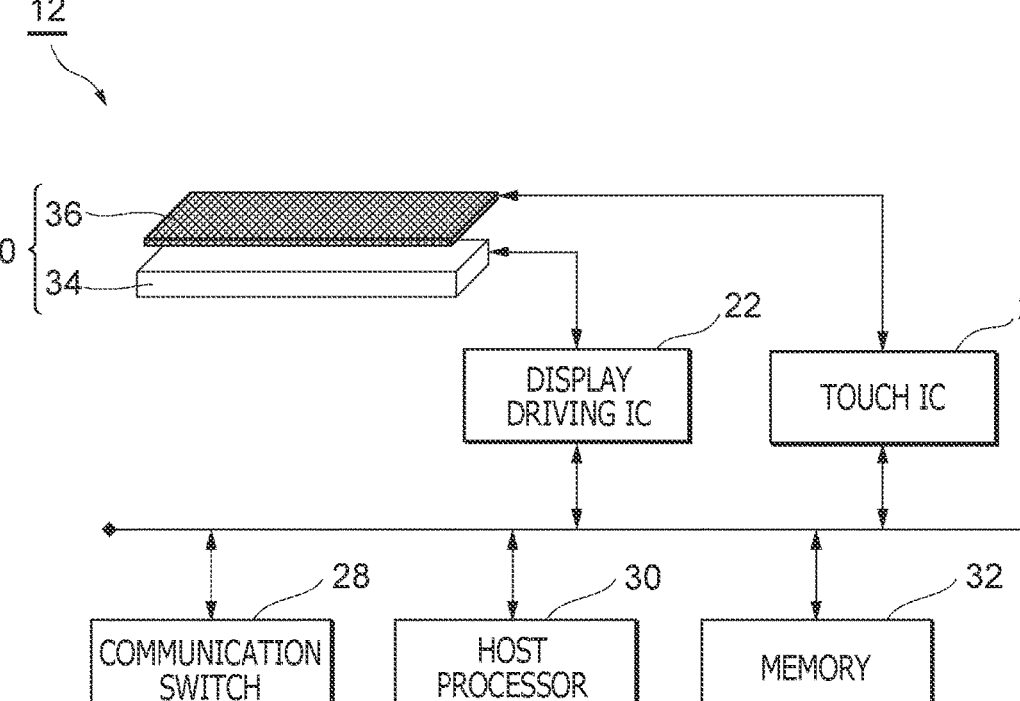

FIG.4
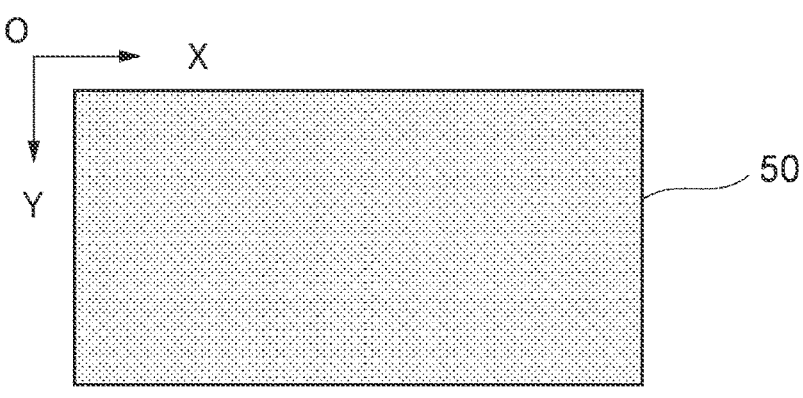
50
SWITCHING OPERATION
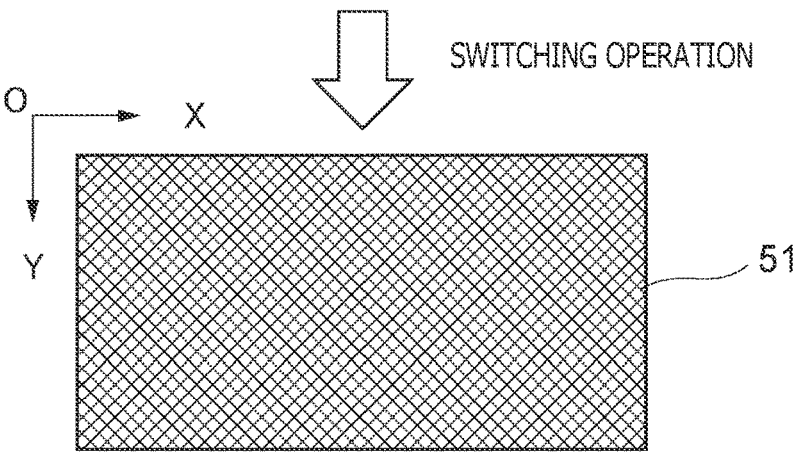
51
SWITCHING OPERATION
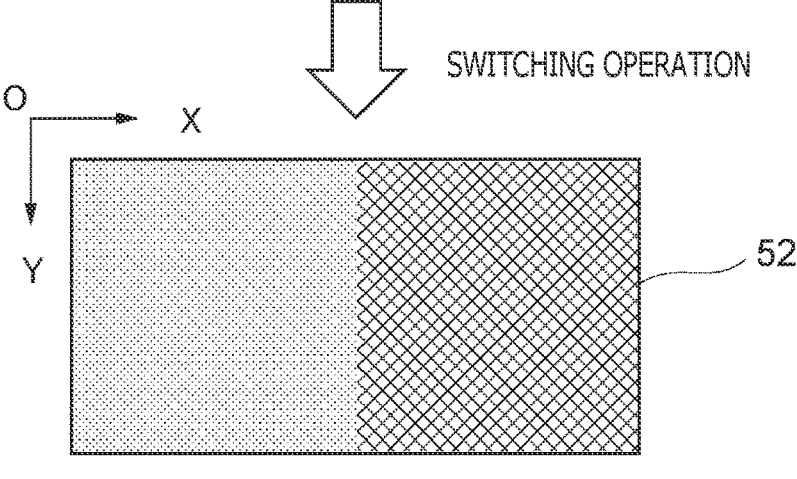
52
SWITCHING OPERATION

F I G . 6
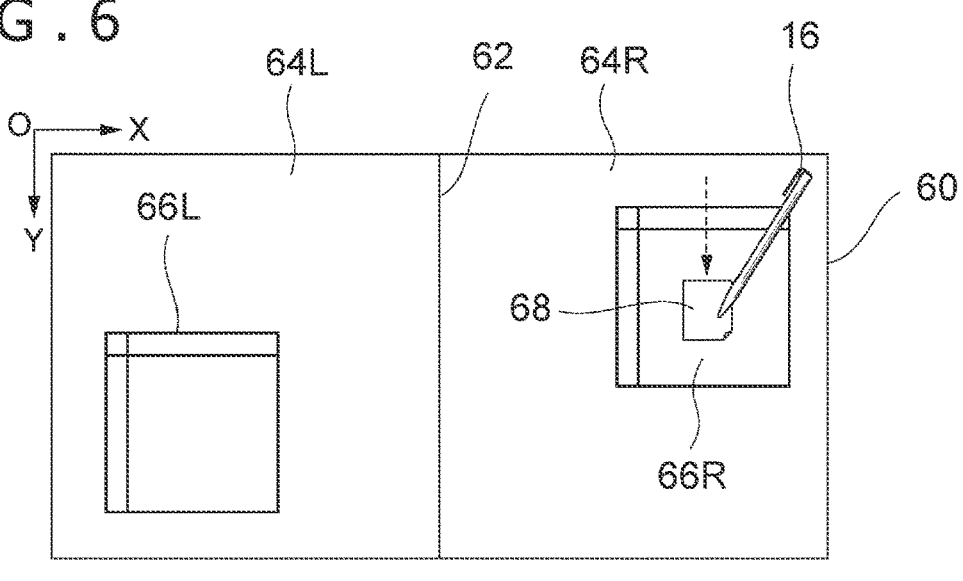
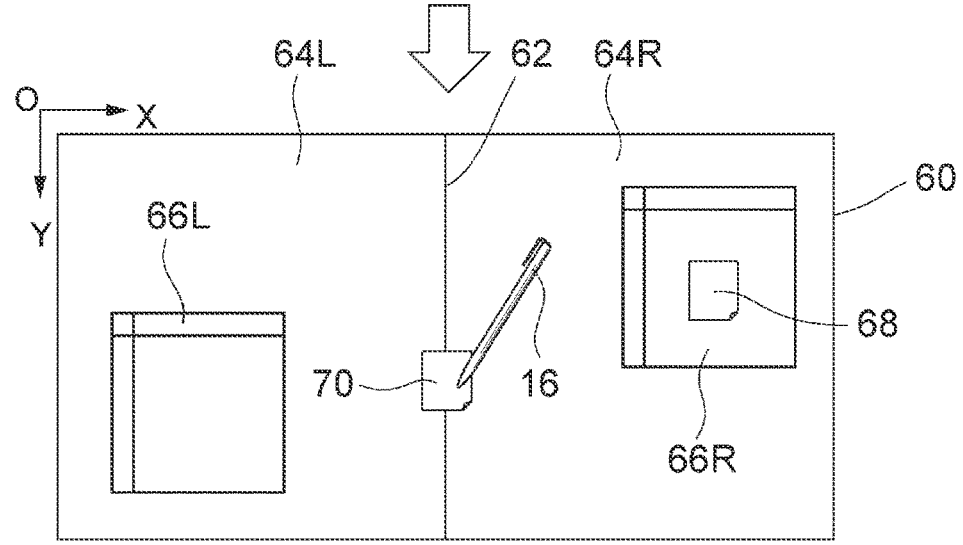
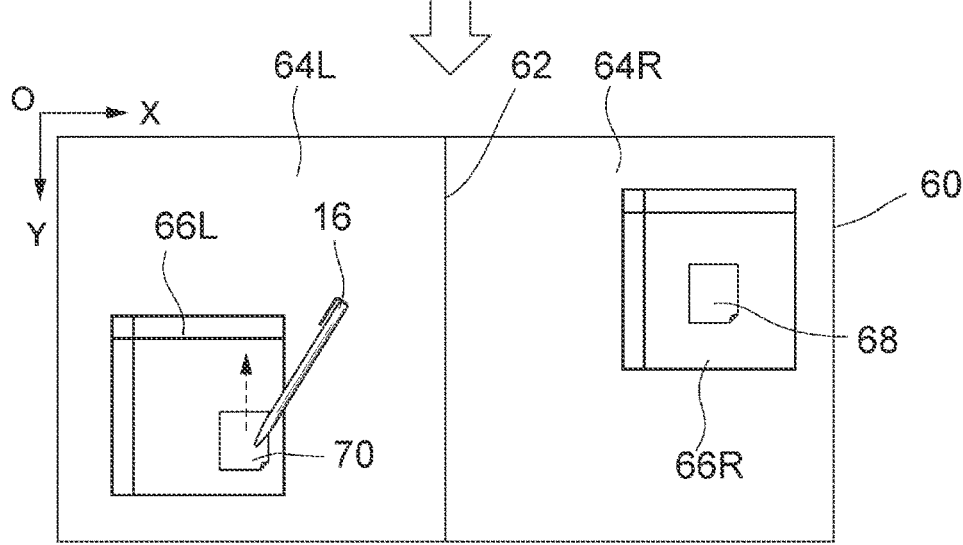

FIG.9
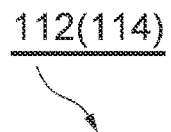
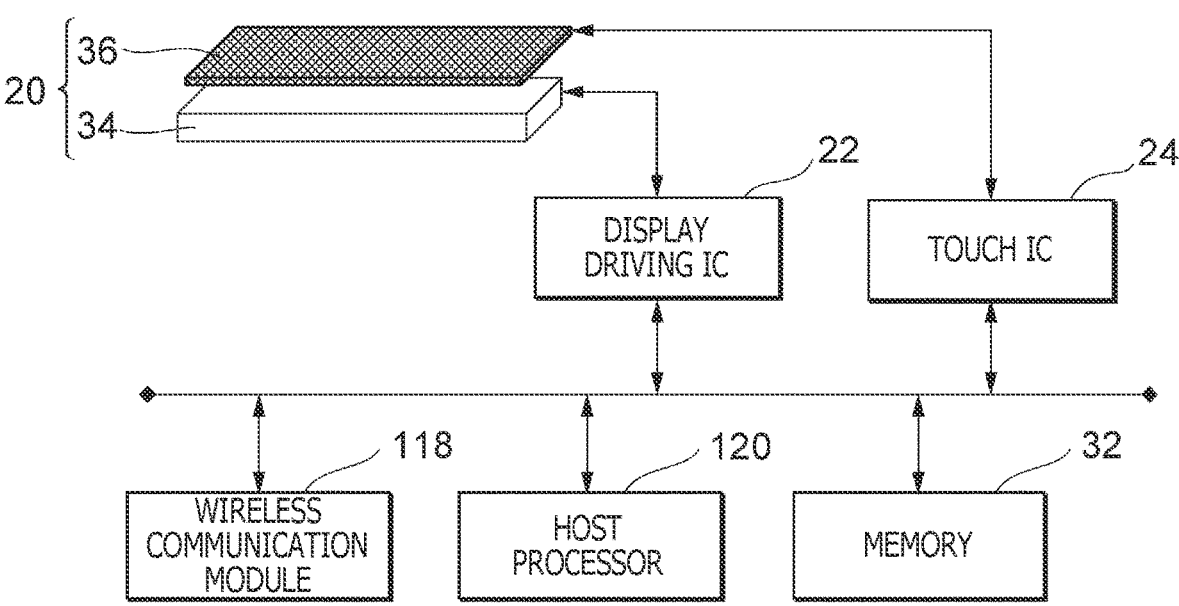

F I G . 1 0
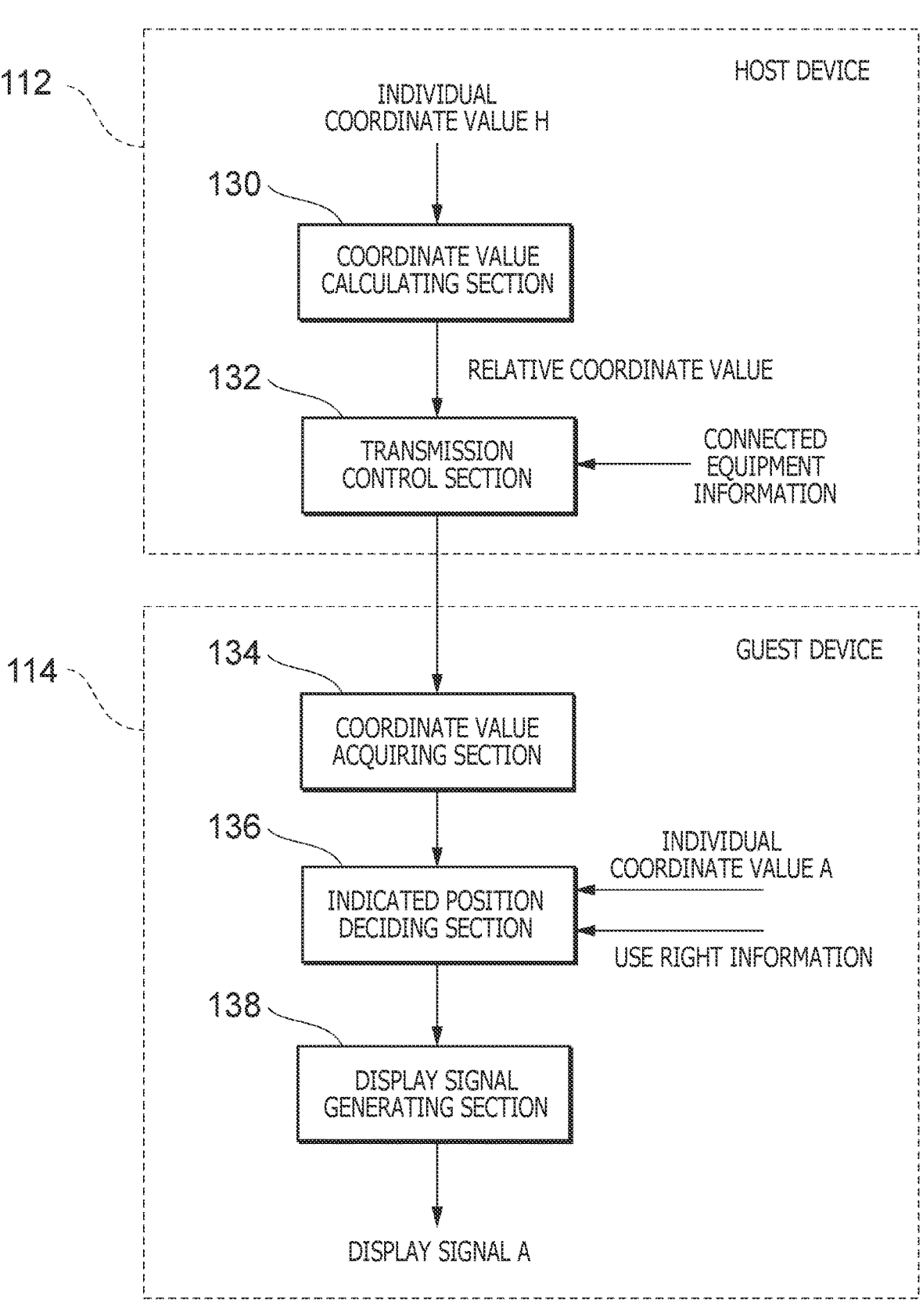

HOST DEVICE AND INPUT-OUTPUT SYSTEM

BACKGROUND

Technical Field

The present disclosure relates to a host device and an input-output system.

Description of the Related Art

As related arts, various techniques for enhancing convenience regarding input or output of information by causing multiple computers to operate together have been proposed. For example, in Japanese Patent Laid-open No. 2021-022309 (hereinafter, referred to as Patent Document 1), an information input device compatible with an environment of multi-device or multi-operating system (OS) is disclosed.

However, in Patent Document 1, it is envisaged that one guest device is alternatively connected to one host device, and room for improvement is left in terms of convenience.

BRIEF SUMMARY

The present disclosure is made in view of such a problem, and an object thereof is to provide a host device and an input-output system that are capable of executing input-output processing with higher convenience in conjunction with multiple guest devices.

A host device according to a first aspect of the present disclosure includes a display device that, in operation, displays an image in a host display region, a communication device that, in operation, communicates with multiple guest devices each having a display function, and a processor that, in operation, divides the host display region into at least two sub-regions and controls the display device to display at least two images currently displayed by at least two of the guest devices simultaneously connected to the host device, such that the at least two images are respectively displayed in corresponding ones of the at least two sub-regions.

Further, the processor, in operation, may control the display device to change at least one of a position of each of the at least two sub-regions, a size of each of the at least two sub-regions, a number of divisions of the at least two sub-regions, and a combination of the at least two guest devices in response to a switching operation made by a user.

Moreover, the processor, in operation, may mediate between a first guest one of the at least two devices and a second one of the at least two guest devices when accepting a graphical user interface (GUI) operation executed across a boundary between a first sub-region corresponding to the first one of the at least two guest devices and a second sub-region corresponding to the second one of the at least two guest devices.

Further, the GUI operation may be a drag and drop operation that moves an icon in the first sub-region into the second sub-region, and when accepting the drag and drop operation, the processor transfers a data file corresponding to the icon from the first one of the at least two of the guest devices to the second one of the at least two of the guest devices via the communication device.

Moreover, the processor, in operation, may selectively give an execution right of the GUI operation in the host display region to the multiple guest devices.

Further, the communication device, in operation, may receive, from any one of the at least two of the guest devices, a relative coordinate value that is obtained by normalizing an individual coordinate value representing an indicated position in a guest display region of the one of the at least two of the guest devices.

Moreover, the processor, in operation, may calculate an indicated position in the host display region using display region information relating to the at least two sub-regions and converts the relative coordinate value received from the one of the at least two of the guest devices.

Further, the processor, in operation, may switch to a duplication mode in which an image currently displayed by any one of the at least two of the guest devices is duplicated and displayed or an expansion mode in which the image is displayed with expansion of a guest display region, in response to a switching operation made by a user.

Moreover, the processor, in operation, may perform information processing relating to display of the image, in execution of the duplication mode or the expansion mode.

An input-output system according to a second aspect of the present disclosure includes multiple guest devices, wherein each guest device of the multiple guest devices, in operation, displays an image in a guest display region of the guest device, and a host device that, in operation, displays at least two images in a host display region of the host device and communicates with each of the multiple guest devices. The host device, in operation, acquires a first indicated position in the host display region of the host device and transmits, to each of the multiple guest devices, a relative coordinate value that is obtained by normalizing a first coordinate value representing the first indicated position on the host side. Each guest device of the multiple guest device, in operation, calculates a second coordinate value representing a second indicated position in the display region of the guest device, using display region information relating to the guest display region of the guest device to convert the relative coordinate value received from the host device.

Further, each guest device of the multiple guest devices, in operation, set whether or not to use the relative coordinate value received by the guest device or the second coordinate value calculated by the guest device, for information processing.

Moreover, when each guest device of the multiple guest device, in operation, sets not to use the relative coordinate value received by the guest device or the second coordinate value calculated by the guest device such that the relative coordinate value received by the guest device or the second coordinate value calculated by the guest device, the guest device may detect the second indicated position calculated by the guest device and use the second position calculated by the guest device for the information processing.

Further, the host device, in operation, may set whether or not to transmit the relative coordinate value to each of the multiple guest devices.

Moreover, when the relative coordinate value is not transmitted from the host device, each guest device of the multiple guest devices, in operation, may detect the second indicated position on the guest device and use the second indicated position for the information processing.

Further, the information processing may be a GUI operation. Alternatively, the information processing may be processing of electronically performing rendering in the guest display region of at least one of the multiple guest devices.

A host device according to a third aspect of the present disclosure is configured to be capable of mutually communicating with multiple guest devices each of which is capable of displaying an image. The host device includes a display device that, in operation, displays an image in a display region, and a processor that, in operation, acquires an indicated position in the display region and transmits, to each of the multiple guest devices, a relative coordinate value obtained by normalizing an individual coordinate value representing the indicated position.

According to the present disclosure, input-output processing with higher convenience can be executed by working together with multiple guest devices.

BRIEF DESCRIPTION OF THE SEVERAL VIEWS OF THE DRAWINGS

FIG. 2 is a hardware configuration diagram of the host device illustrated in FIG. 1;

FIG. 4 is a diagram illustrating a first example of a screen transition at the time of execution of a multi-display operation;

FIG. 6 is a diagram illustrating one example of a screen transition at the time of execution of a data sharing assist operation;

FIG. 9 is a hardware configuration diagram of a host device and a guest device illustrated in FIG. 8;

FIG. 10 is a functional block diagram of the host device and the guest device illustrated in FIG. 8;

DETAILED DESCRIPTION

Embodiments of the present disclosure will be described below with reference to the accompanying drawings. To make understanding of explanation easy, the same constituent element is given the same reference sign as much as possible in the respective drawings, and overlapping description is omitted. Further, it is obvious that the present disclosure is not limited to the following first and second embodiments and can freely be changed without departing from the gist of this disclosure. Alternatively, the respective configurations may be combined as desired in a range in which contradiction is not caused technically.

First Embodiment

Figure 1:
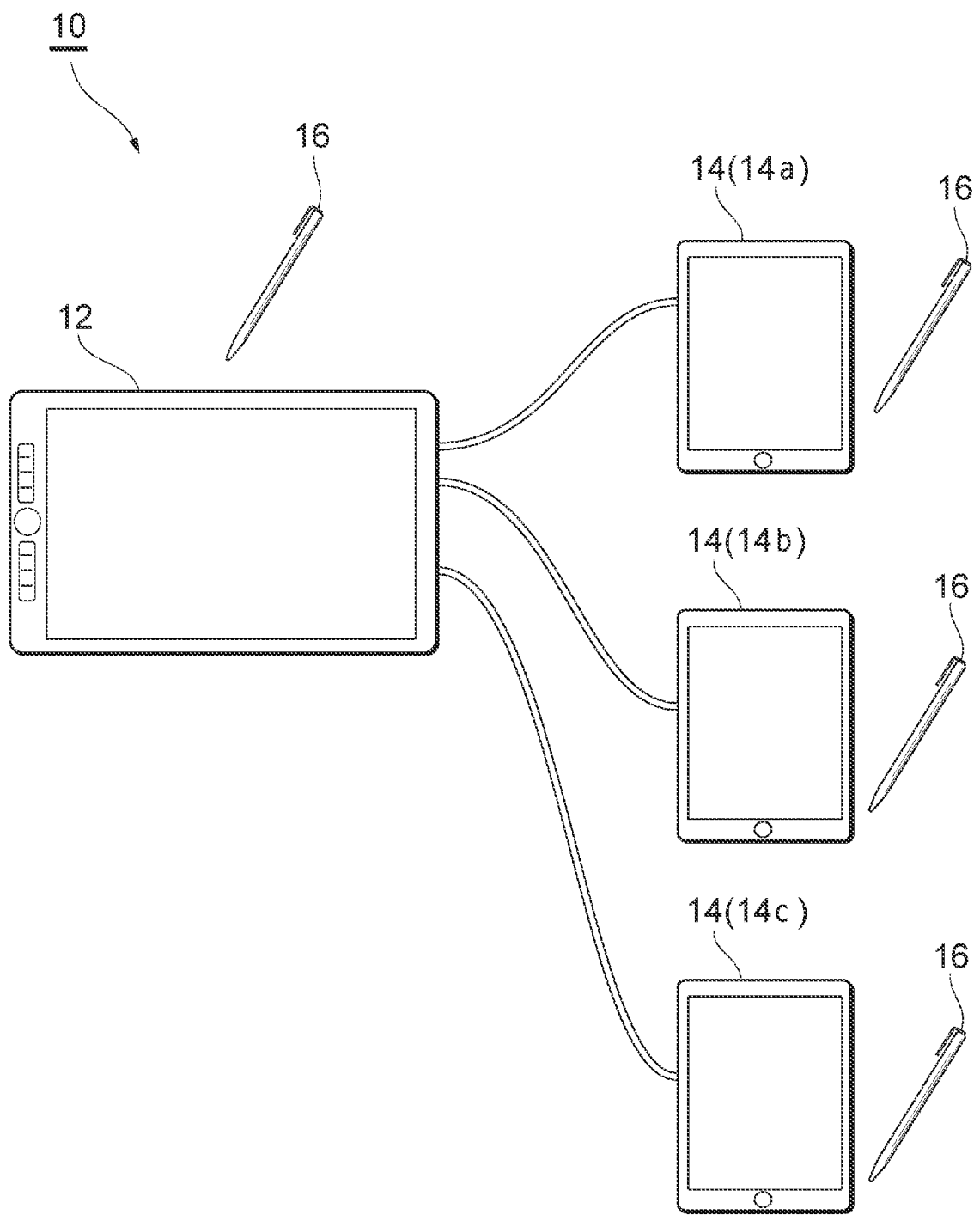
FIG. 1 is an overall configuration diagram of an input-output system incorporating a host device according to a first embodiment of the present disclosure.

First, a host device and an input-output system according to the first embodiment of the present disclosure will be described with reference to FIG. 1 to FIG. 7.
Device Configuration
FIG. 1 is an overall configuration diagram of an input-output system 10 incorporating a host device 12 according to the first embodiment of the present disclosure. The input-output system 10 is configured to be capable of execution of various kinds of information processing involving multiple users, when multiple computers operate together. Specifically, the input-output system 10 includes one host device 12, multiple (in the example of FIG. 1, three) guest devices 14, and multiple (in the example of FIG. 1, four) electronic pens 16.

The host device 12 is electronic equipment including a touch panel display 20 (FIG. 2) and is configured from a tablet terminal, a personal computer, a smartphone, or the like, for example. The specific hardware configuration and functional blocks of the host device 12 will be described in detail later with FIG. 2 and FIG. 3.

Similarly to the host device 12, the guest devices 14 are pieces of electronic equipment each including a touch panel display and are each configured from a tablet terminal, a smartphone, a personal computer, or the like, for example. In the example of FIG. 1, the respective guest devices 14 are simultaneously connected to the host device 12 in parallel through wired communication. In the following, to identify the individual guest devices 14, they are denoted by reference signs 14a, 14b, and 14c in some cases.

The electronic pens 16 are pointing devices of a pen type and are configured to be capable of communication with the host device 12 or the guest device 14. The electronic pens 16 are styluses of an active electrostatic (AES) system or an electromagnetic resonance (EMR) system, for example. A user can write a picture or character to the host device 12 or the guest device 14 by grasping and moving the electronic pen 16 while pressing the pen tip against a touch surface.

FIG. 2 is a hardware configuration diagram of the host device 12 illustrated in FIG. 1. Specifically, the host device 12 includes the touch panel display 20, an integrated circuit for display driving (hereinafter, referred to as a "display driving integrated circuit (IC) 22"), an integrated circuit for a touch sensor (hereinafter, referred to as a "touch IC 24"), multiple wired communication interfaces (I/Fs) 26 (communication devices), a communication switch 28, a host processor 30 (processor), and a memory 32.

The touch panel display 20 includes a display panel 34 (display device) that can display content visibly and a planar touch sensor 36 disposed over or under the display panel 34 in an overlapped manner. The display panel 34 can display a monochrome image or a color image and may be a liquid crystal panel, an organic electro-luminescence (EL) panel, electronic paper, or the like, for example.

The touch sensor 36 includes multiple X line electrodes for detecting the position in an X-axis of a sensor coordinate system and multiple Y line electrodes for detecting the position in a Y-axis, for example. The display panel 34 and the touch sensor 36 have a certain positional relation. Hence, detecting an indicated position in the sensor coordinate system is equivalent to detecting an indicated position in a display coordinate system of the display panel 34.

The display driving IC 22 is an integrated circuit that executes driving control of the display panel 34. The display driving IC 22 drives the display panel 34 on the basis of a display signal supplied from the host processor 30. This causes various kinds of content such as an image, a video, a window, and a digital ink to be displayed on the display panel 34.

The touch IC 24 is an integrated circuit that executes driving control of the touch sensor 36. The touch IC 24 drives the touch sensor 36 on the basis of a control signal supplied from the host processor 30. This causes the touch IC 24 to execute a "pen detection function" to detect the state of the electronic pen 16 and a "touch detection function" to detect a touch by a finger of a user or the like.

For example, this pen detection function includes a function of scanning the touch sensor 36, a function of receiving and analyzing a downlink signal, a function of estimating the state (for example, position, posture, and writing pressure) of the electronic pen 16, and a function of generating and transmitting an uplink signal including a command to the electronic pen 16. Further, for example, the touch detection function includes a function of scanning the touch sensor 36 two-dimensionally, a function of acquiring a detection map on the touch sensor 36, and a function of classifying regions on the detection map (for example, classification of a finger, a palm, and so forth).

A GUI is constructed by combining the input function of the electronic pen 16 and the touch sensor 36 and the output function of the display panel 34 as above.

Each of the wired communication I/Fs 26 is an interface for establishing connection with peripheral equipment (here, the guest device 14) through a cable and is configured from a universal serial bus (USB) (registered trademark) I/F, for example. The communication switch 28 has a switch function of switching the connection destinations dynamically or statically on the basis of a control signal supplied from the host processor 30.

The host processor 30 is configured by a processing calculation device including a central processing unit (CPU), a micro-processing unit (MPU), and a graphics processing unit (GPU). The host processor 30 executes various functions to be described in detail with FIG. 3, by reading out a program stored in the memory 32 and executing it.

The memory 32 is configured by a non-transitory, computer-readable storage medium. Here, the computer-readable storage medium is a storing device including a read only memory (ROM), a random access memory (RAM), a hard disk drive (HDD), or a solid state drive (SSD) or is a portable medium such as a magneto-optical disc, a compact disc (CD)-ROM, or a flash memory.

Functional Block Diagram

Figure 3:
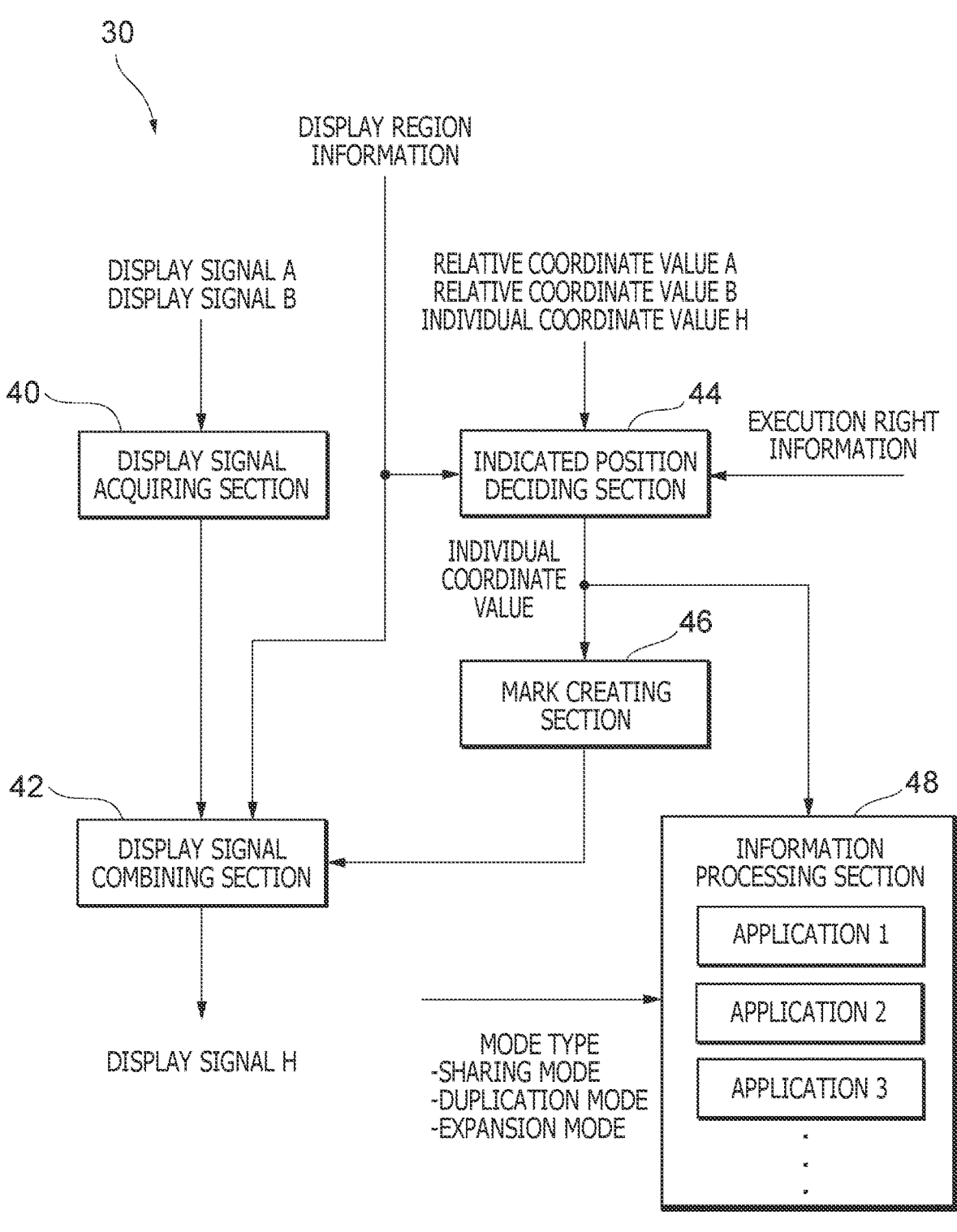
FIG. 3 is a functional block diagram of a host processor illustrated in FIG. 2.

FIG. 3 is a functional block diagram of the host processor 30 illustrated in FIG. 2. The host processor 30 functions as a display signal acquiring section 40, a display signal combining section 42, an indicated position deciding section 44, a mark creating section 46, and an information processing section 48 by reading out a program stored in the memory 32 (FIG. 2) and executing it.

The display signal acquiring section 40 acquires, from the guest devices 14, display signals representing images currently displayed by the guest devices 14. Here, the "image" is an image in units of frames and may be either a still image or a moving image (or video).

The display signal combining section 42 combines the display signals acquired by the display signal acquiring section 40, according to a set display mode. Examples of the display mode include [1] a "sharing mode" for sharing the display function of the host device 12 by multiple users, [2] a "duplication mode" in which an image currently displayed by the guest device 14 is duplicated and displayed, and [3] an "expansion mode" in which an image is displayed with expansion of the display region on the guest side. The "combining of signals" includes, for example, [1] deformation processing such as enlargement, reduction, and rotation of an image, [2] layout processing for executing multi-display, and [3] addition processing for superimposing a mark such as a cursor or pointer.

Further, the display signal combining section 42 combines the display signals by using information relating to the display region on the host side or the guest side (hereinafter, referred to as "display region information"). Examples of the display region information include [1] display information including the resolution, size, and type of the display panel 34 and the number of pixels in the display panel 34, [2] sensor information including the resolution, size, and type of the touch sensor 36 and the number of sensor elements in the touch sensor 36, and [3] multi-display information including the position and size of a sub-region upon multi-display, the number of divisions of the sub-regions, the correspondence between the sub-regions and the guest devices 14, and the combination of the guest devices 14 that are subjects of the multi-display. This display region information is set and updated through an operation made on a setting screen displayed by the host device 12, for example.

The indicated position deciding section 44 individually acquires an indicated position in the display region of the guest device 14 (hereinafter, also referred to as an "indicated position on the guest side") and an indicated position in the display region of the host device 12 (hereinafter, also referred to as an "indicated position on the host side"). This "indicated position on the guest side" is identified based on a relative coordinate value (or common coordinate value) which is obtained by normalizing an individual coordinate value representing the indicated position. For example, when the X coordinate value and the Y coordinate value are each normalized in a range of [0, 1], the center position of the display region is represented as (0.5, 0.5). Further, the "indicated position on the host side" is identified based on an individual coordinate value representing the indicated position.

When simultaneously acquiring multiple indicated positions, the indicated position deciding section 44 refers to information relating to the execution right of a GUI operation (hereinafter, referred to as "execution right information"), selects one of the multiple indicated positions, and decides the selected position as the indicated position used for information processing. This execution right information is identification information of the device given the execution right and is, for example, network information such as a host name or a media access control (MAC) address. This execution right information is set and updated through an operation made on a setting screen displayed by the host device 12, for example. When the indicated position on the guest device 14 is selected, the indicated position deciding section 44 uses the display region information of the host device 12 to execute conversion from the relative coordinate value represented by the selected indicated position, to the individual coordinate value corresponding to the host device 12.

The mark creating section 46 creates a mark suitable for an application currently executed. Examples of this mark include a dot, a cursor, a pointer, and an icon. The created mark is supplied to the display signal combining section 42 together with the indicated position (here, an individual coordinate value) acquired by the indicated position deciding section 44.

The information processing section 48 executes various kinds of information processing (for example, GUI processing, rendering processing, and so forth) by executing multiple kinds of applications solely or concurrently. Further, the information processing section 48 is configured to be capable of executing another kind of information processing in the background at the time of execution of the duplication mode or the expansion mode. Here, examples of the "other kind of information processing" include processing of saving a video and a sound and processing of distributing them to another terminal.

Operation Performed in Cooperation with Devices

The input-output system 10 according to the first embodiment is configured as above. Next, the operation of the input-output system 10, particularly the operation performed in cooperation with the host device 12 and the guest devices 14, will be described with reference to FIG. 4 to FIG. 7. Now, [1] a multi-display operation, [2] a data sharing assist operation, [3] an execution right selection operation, and [4] a duplication/expansion display operation will be described in detail below, by way of example.

1. Multi-Display Operation

The host processor 30 of the host device 12 dynamically changes the layout of a screen displayed on the display panel 34, in response to a specific operation made by a user. The specific operation may be an operation of pressing a functional button disposed in the host device 12 or the electronic pen 16, for example.

FIG. 4 is a diagram illustrating a first example of a screen transition at the time of execution of the multi-display operation. In the example of this diagram, the case in which two guest devices 14a and 14b are simultaneously connected to one host device 12 is assumed. In the display region on the host side, a first display screen 50 is displayed in the initial state. The display screen 50 is equivalent to a screen which is duplicated from an image currently displayed by one guest device 14a and which is displayed across the whole of the display region on the host side. For example, when accepting a pressing-down operation of a functional button, the host device 12 switches the present display screen 50 to a new display screen 51 and displays the display screen 51.

The second display screen 51 is equivalent to a screen which is duplicated from an image currently displayed by the other guest device 14b and which is displayed across the whole of the display region on the host side. When accepting a pressing-down operation of the functional button, the host device 12 switches the present display screen 51 to a new display screen 52 and displays the display screen 52.

The third display screen 52 is equivalent to a screen in which the images currently displayed by both of the guest devices 14a and 14b are multi-displayed to line up in the left-right direction of the display region on the host side. Specifically, the image currently displayed by the guest device 14a is displayed in the left half of the display screen 52, and the image currently displayed by the guest device 14b is displayed in the right half of the display screen 52. When accepting a pressing-down operation of the functional button, the host device 12 switches the present display screen 52 to the new display screen 50 and displays the display screen 50. From then on, when the user repeats the operation of the functional button, the display screen of the host device 12 is switched in order of 50, 51, 52, 50, . . . .

Figure 5:
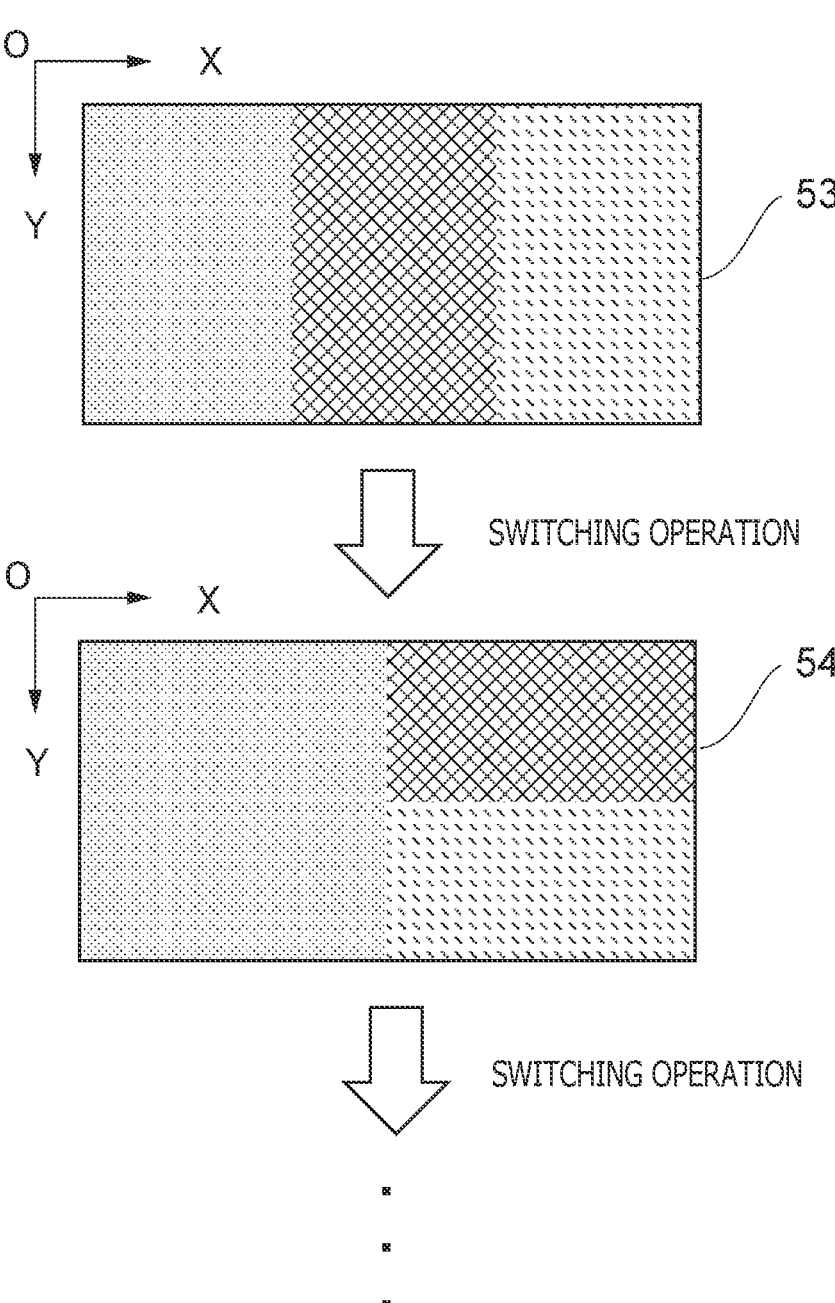
FIG. 5 is a diagram illustrating a second example of a screen transition at the time of execution of the multi-display operation.

FIG. 5 is a diagram illustrating a second example of the screen transition at the time of execution of the multi-display operation. In the example of this diagram, the case in which three guest devices 14a, 14b, and 14c are simultaneously connected to one host device 12 is assumed. In the display region on the host side, a first display screen 53 is displayed in the initial state. The display screen 53 is equivalent to a screen in which images currently displayed by the three guest devices 14a, 14b, and 14c are multi-displayed to line up in the left-right direction of the display region on the host side. Specifically, the image currently displayed by the guest device 14a is displayed in a left part of the display screen 53. The image currently displayed by the guest device 14b is displayed in a middle part of the display screen 53. The image currently displayed by the guest device 14c is displayed in a right part of the display screen 53. For example, when accepting a pressing-down operation of the functional button, the host device 12 switches the present display screen 53 to a new display screen 54 and displays the display screen 54.

The second display screen 54 is equivalent to a screen in which the images currently displayed by the three guest devices 14a, 14b, and 14c are multi-displayed to line up in the left-right direction or the upward-downward direction of the display region. Specifically, the image currently displayed by the guest device 14a is displayed in the left half of the display screen 54. The image currently displayed by the guest device 14b is displayed in a right upper part of the display screen 54. The image currently displayed by the guest device 14c is displayed in a right lower part of the display screen 54. From then on, when the user repeats the operation of the functional button, the display screen of the host device 12 is switched in order of 53, 54, 53, . . . .

In this manner, at least one of the position of the sub-region, the size of the sub-region, the number of divisions of the sub-regions, and the combination of the guest devices 14 is changed in response to the switching operation made by the user. This makes it possible to execute display processing that is suitable for the use purpose and the use situation and that provides high convenience.

2. Data Sharing Assist Operation

The host processor 30 of the host device 12 executes an operation of assisting sharing of data between two guest devices 14a and 14b at the time of execution of the sharing mode.

FIG. 6 is a diagram illustrating one example of a screen transition at the time of execution of the data sharing assist operation. In the example of this diagram, the case in which two guest devices 14a and 14b are simultaneously connected to one host device 12 is assumed. In a display region 60 on the host side, a multi-screen which is divided into two regions by a boundary line 62 extending in the upward-downward direction is displayed similarly to the display screen 52 in FIG. 4.

In a sub-region 64R on the right side of the boundary line 62, a screen currently displayed by the guest device 14a is duplicated and displayed. Here, a window 66R displaying a list of pieces of data held by the guest device 14a is placed at a right upper part of the sub-region 64R. For example, an icon 68 indicating a data file F is displayed in the window 66R. Meanwhile, in a sub-region 64L on the left side of the boundary line 62, a screen currently displayed by the guest device 14b is duplicated and displayed. Here, a window 66L displaying a list of pieces of data to be shared is displayed at a left lower part of the sub-region 64L.

For example, the user of the host device 12 executes a pen-down operation at the position of the icon 68 by using the electronic pen 16 and then executes a pen-move operation in a left downward direction. As a result, a duplicated icon 70 appears. In addition, the icon 70 moves to follow the pen tip of the electronic pen 16.

When the position indicated by the electronic pen 16 reaches the boundary line 62 between the sub-regions 64R and 64L, the icon 70 in one sub-region 64R disappears, and the icon 70 appears in the other sub-region 64L. The user further executes the pen-move operation in a left downward direction and then executes a pen-up operation at the position of the window 66L on the left side. As a result, the same icon 70 as the icon 68 is newly displayed in the window 66L. That is, duplication and movement of the icon 68 are executed through a drag and drop operation.

Figure 7:
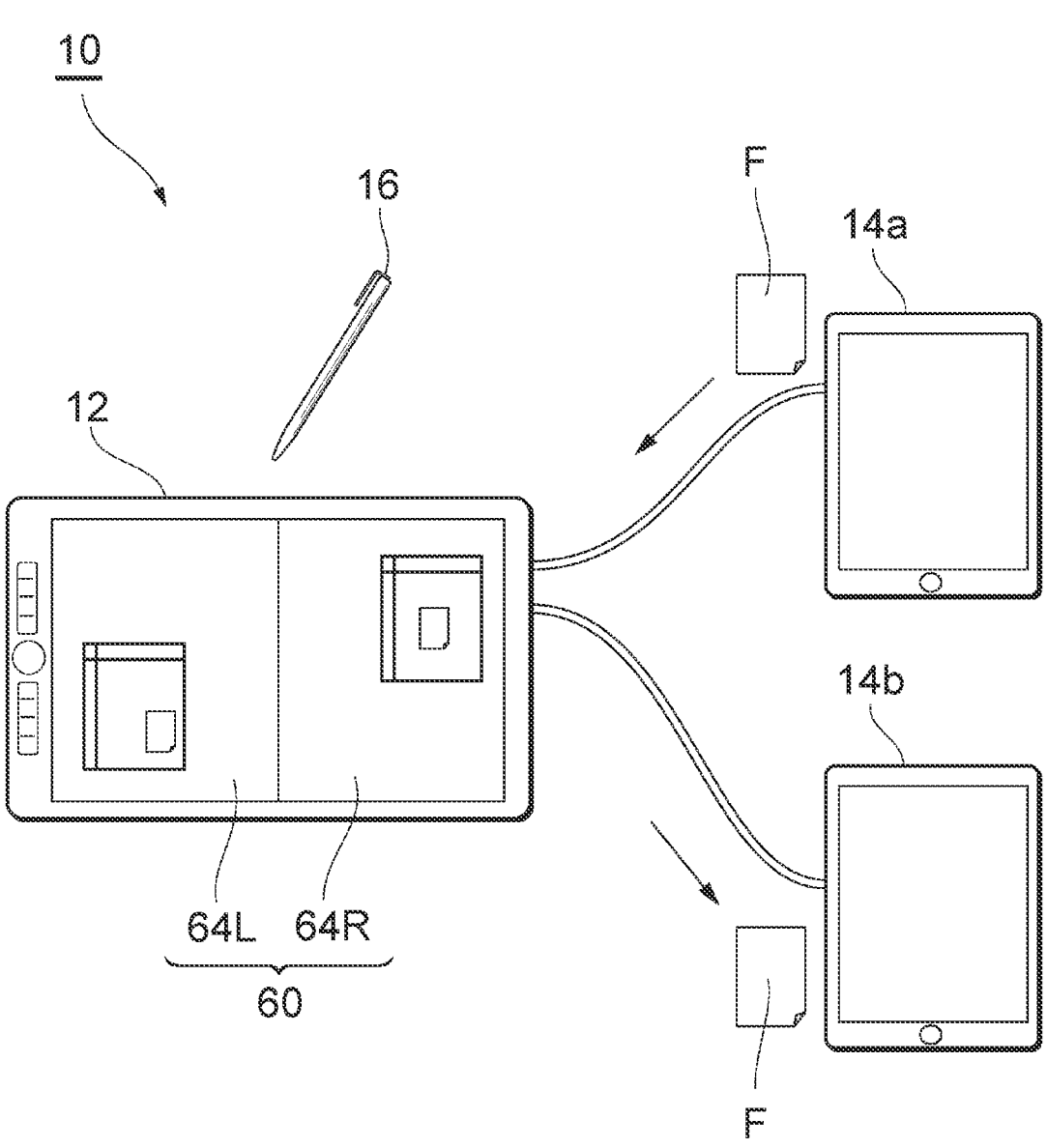
FIG. 7 is a diagram illustrating the flow of data in the data sharing assist operation.

FIG. 7 is a diagram illustrating the flow of data in the data sharing assist operation. When the drag and drop operation illustrated in FIG. 6 is executed, the data file F held by the guest device 14*a* is automatically shared by the guest device 14*b*. Specifically, the host device 12 receives the data file F associated with the icon 68 in FIG. 6 from the guest device 14*a* and temporarily stores the data file F in the memory 32 (FIG. 2). Then, the host device 12 transfers, to the guest device 14*b*, the data file F acquired from the guest device 14*a*. This causes the desired data file F to be shared between the guest devices 14*a* and 14*b*.

3. Execution Right Selection Operation

The host processor 30 of the host device 12 selectively gives the execution right of the GUI operation in the display region 60 on the host side to multiple guest devices 14 at the time of execution of the sharing mode. With this, the user of the guest device 14 given the execution right is allowed to remotely operate the host device 12 and can execute the drag and drop operation described in FIG. 6 by oneself, for example.

In this case, it is sufficient if the host device 12 receives, from the guest device 14*a*, the relative coordinate value which is obtained by normalizing the individual coordinate value representing the indicated position in the display region on the guest side, and uses the display region information relating to the sub-region 64R to convert the relative coordinate value received from the guest device 14*a*, thereby calculating the indicated position in the display region 60 on the host side.

4. Duplication/Expansion Display Operation

The host processor 30 of the host device 12 may execute display control to switch to the duplication mode or the expansion mode in response to a specific operation made by the user. Here, the "duplication mode" is a mode in which an image currently displayed by the guest device 14 is duplicated and displayed. Further, the "expansion mode" is a mode in which an image is displayed with expansion of the display region on the guest side. Moreover, the "specific operation" may be an operation of pressing a hardware switch such as a power button, for example.

In particular, in execution of the duplication mode or the expansion mode, the host processor 30 may execute not only processing of displaying an image but also another kind of information processing relating to this display (for example, processing of saving a video and a sound, processing of distributing them to another terminal, and so forth). This makes it possible to utilize the host processor 30 more effectively than in the case of executing only the display processing (case of making a transition to what is called a sleep state).

Effects Produced by First Embodiment

As described above, the host device 12 according to the first embodiment includes the display device (here, the display panel 34) that displays an image in the display region 60 on the host side, the communication device (here, the wired communication OF 26) configured to be capable of communicating with the multiple guest devices 14 each having a display function, and the processor (here, the host processor 30) that executes display control to divide the display region 60 on the host side into at least two sub-regions 64R and 64L and execute multi-display of images currently displayed by at least two guest devices 14 simultaneously connected to the host device 12, in such a manner that the images are displayed in corresponding ones of the sub-regions 64R and 64L.

By executing the multi-display of images currently displayed by at least two guest devices 14 simultaneously connected to the host device 12, in such a manner that the images are displayed in corresponding ones of the sub-regions 64R and 64L as above, the host device 12 functions as a hub of the multiple guest devices 14. This makes it possible to execute input-output processing with higher convenience in conjunction with the multiple guest devices 14.

Further, the host processor 30 may execute display control to change at least one of the position of each of the sub-regions 64R and 64L, the size of each of the sub-regions 64R and 64L, the number of divisions of the sub-regions 64R and 64L, and the combination of the guest devices 14 in response to a switching operation made by a user.

Also, the host processor 30 may execute processing of mediating between the guest devices 14*a* and 14*b* when accepting the GUI operation executed across the boundary between the sub-region 64R corresponding to the guest device 14*a* and the sub-region 64L corresponding to the guest device 14*b*.

Further, in a case where the GUI operation is a drag and drop operation for moving an icon in the sub-region 64R into the sub-region 64L and where the host processor 30 accepts the drag and drop operation, the host processor 30 may execute processing of transferring a data file F corresponding to the icon from the guest device 14*a* to the guest device 14*b* via the communication switch 28. This allows sharing of data in such a manner that the user can visually recognize the sharing, without direct communication between the guest devices 14*a* and 14*b*.

In addition, the host processor 30 may selectively give the execution right of the GUI operation in the display region 60 on the host side to the multiple guest devices 14. This allows the user of the guest device 14 to remotely execute the GUI operation of the host device 12 through the guest device 14 given the execution right.

Further, the wired communication OF 26 may receive, from the guest device 14, the relative coordinate value which is obtained by normalizing the individual coordinate value representing an indicated position in the display region on the guest side. In this case, the host processor 30 may calculate the indicated position in the display region 60 on the host side by using the display region information relating to the sub-region 64R or 64L to convert the relative coordinate value received from the guest device 14. With this, even when the display region information on the host side does not correspond with the display region information on the guest side, the indicated positions on both sides can accurately be associated with each other.

Moreover, the host processor 30 may execute display control to switch to the duplication mode in which an image currently displayed by the guest device 14 is duplicated and displayed or the expansion mode in which an image is displayed with expansion of the display region on the guest side, in response to a switching operation made by a user.

Furthermore, the host processor 30 may execute another kind of information processing relating to display of an image, in execution of the duplication mode or the expansion mode. This makes it possible to utilize the host processor 30 more effectively than in the case of executing only the display processing (case of making a transition to what is called a sleep state).

Second Embodiment

Next, an input-output system and a host device according to the second embodiment of the present disclosure will be described with reference to FIG. 8 to FIG. 12.

Device Configuration

Figure 8:
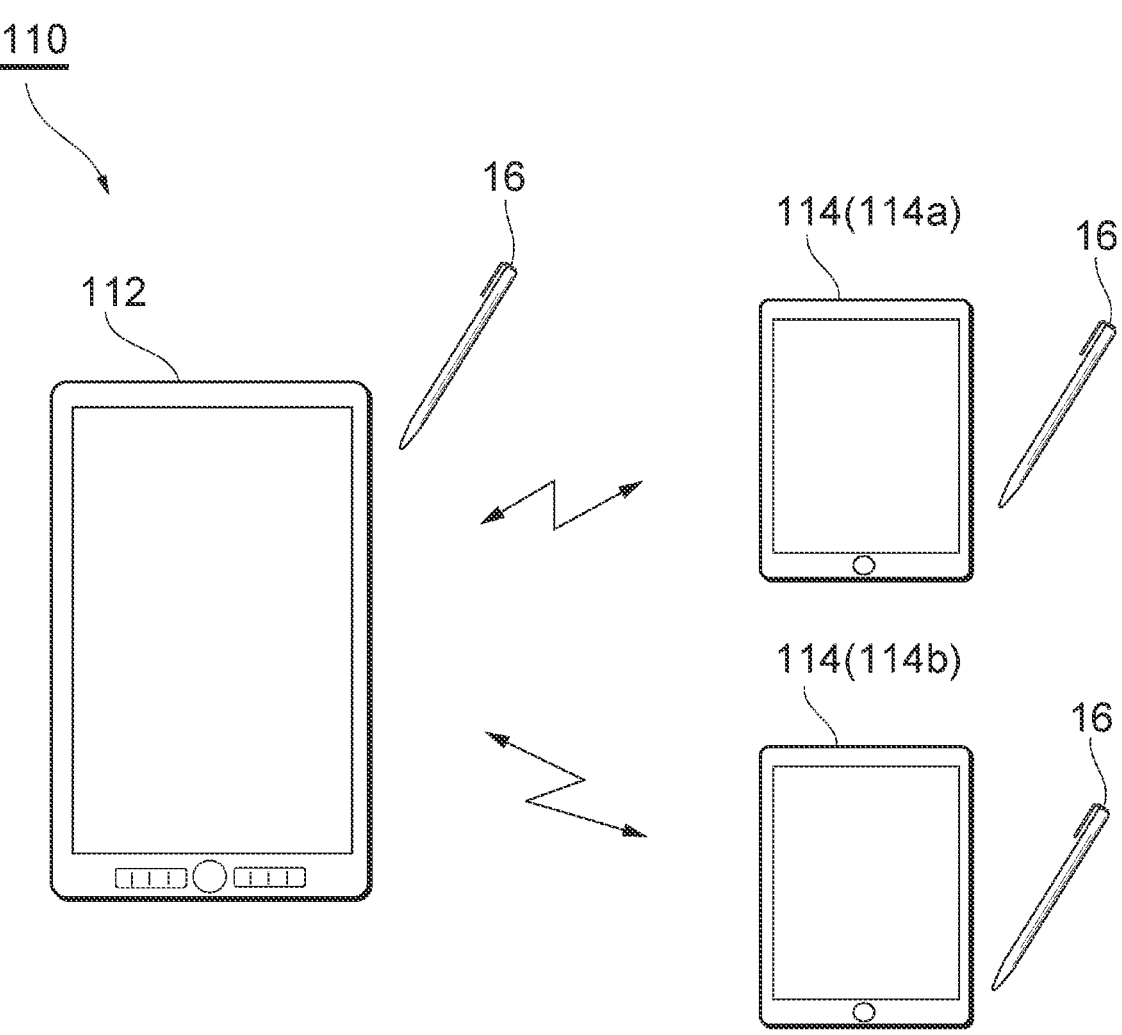
FIG. 8 is an overall configuration diagram of an input-output system incorporating a host device according to a second embodiment of the present disclosure.

FIG. 8 is an overall configuration diagram of an input-output system 110 incorporating a host device 112 according to the second embodiment of the present disclosure. Similarly to the first embodiment (FIG. 1), the input-output system 110 is configured to be capable of execution of various kinds of information processing involving multiple users, when multiple computers operate together. Specifically, the input-output system 110 includes one host device 112, multiple (in the example of FIG. 8, two) guest devices 114, and multiple (in the example of FIG. 8, three) electronic pens 16.

The host device 112 is electronic equipment including the touch panel display 20 (FIG. 9) and is configured from a tablet terminal, a personal computer, a smartphone, or the like, for example. The specific hardware configuration and functional blocks of the host device 112 will be described in detail later with FIG. 9 and FIG. 10.

Similarly to the host device 112, each of the guest devices 114 is electronic equipment including a touch panel display and is configured from a tablet terminal, a smartphone, a personal computer, or the like, for example. In the example of FIG. 8, the respective guest devices 114 are simultaneously connected to the host device 112 in parallel through wireless communication. In the following, to identify the individual guest devices 114, they are denoted by reference signs 114a and 114b in some cases.

FIG. 9 is a hardware configuration diagram of the host device 112 and the guest device 114 illustrated in FIG. 8. Here, the host device 112 is described by way of example. Specifically, the host device 112 includes a wireless communication module 118 (communication device) and a host processor 120 (processor) in addition to the touch panel display 20, the display driving IC 22, the touch IC 24, and the memory 32 which are configured similarly to those in FIG. 2.

The wireless communication module 118 is an interface for establishing connection with an external device (here, the guest device 114) through an intranet or the Internet by wireless communication including Bluetooth (registered trademark) and Wi-Fi. The wireless communication module 118 is configured to be capable of switching the connection destinations dynamically or statically based on communication control by the host processor 120.

The host processor 120 is configured by a processing calculation device including a CPU, an MPU, and a GPU. The host processor 120 executes various functions to be described in detail with FIG. 10, by reading out a program stored in the memory 32 and executing it.

Functional Block Diagram

FIG. 10 is a functional block diagram of the host device 112 and the guest device 114 illustrated in FIG. 8. The host processor 120 of the host device 112 functions as a coordinate value calculating section 130 and a transmission control section 132 by reading out a program stored in the memory 32 (FIG. 9) and executing it. The host processor 120 of the guest device 114 functions as a coordinate value acquiring section 134, an indicated position deciding section 136, and a display signal generating section 138 by reading out a program stored in the memory 32 and executing it.

The coordinate value calculating section 130 normalizes an individual coordinate value (first coordinate value) detected by the touch sensor 36 with the use of display region information on the host side. For example, when the X coordinate and the Y coordinate are each normalized in a range of [0, 1], the center position of the display region is represented as (0.5, 0.5).

The transmission control section 132 executes control to refer to information relating to equipment connected to the host device 112 (hereinafter, also referred to as "connected equipment information") and transmit a relative coordinate value calculated by the coordinate value calculating section 130. This connected equipment information is set and updated through an operation made on a setting screen displayed by the host device 112 or the guest device 114, for example. Examples of the connected equipment information include [1] network information including a host name, an Internet protocol (IP) address, and a MAC address and [2] setting information including information indicating whether or not transmission is enabled, how often the transmission is executed, and the transmission order.

The coordinate value acquiring section 134 acquires the relative coordinate value transmitted from the host device 112. It should be noted that the guest device 114 does not have to acquire display information (for example, resolution and size of the display panel 34 and so forth) on the host side because the indicated position has already been normalized.

The indicated position deciding section 136 acquires each of the indicated positions on the host side and the guest side. This "indicated position on the host side" is the relative coordinate value acquired by the coordinate value acquiring section 134. Further, the "indicated position on the guest side" is the individual coordinate value of the guest device 114 detected by the touch sensor 36 of the guest device 114.

When simultaneously acquiring multiple indicated positions, the indicated position deciding section 136 refers to information relating to the use right of the indicated position (hereinafter, also referred to as "use right information"), selects at least one of the multiple indicated positions, and decides the selected position as the indicated position used for information processing. This use right information is set and updated through an operation made on a setting screen displayed by the guest device 114, for example. Examples of the use right information include [1] the execution right of the GUI operation and [2] setting information indicating whether or not the indicated position is used for information processing. This "information processing" may be various kinds of processing including rendering processing, image processing, document processing, and table calculation processing.

When the indicated position on the host device 112 is selected, the indicated position deciding section 136 uses the display region information of the guest device 114 to execute conversion from the relative coordinate value represented by the selected indicated position, to an individual coordinate value (second coordinate value) suitable for the guest device 114.

The display signal generating section 138 generates a display signal for driving control of the display panel 34, by using the individual coordinate value supplied from the indicated position deciding section 136. Specifically, for a display signal representing a screen including a wallpaper, a window, or the like, the display signal generating section 138 executes processing of placing a mark suitable for a currently-executed application at a corresponding indicated position in an overlapped manner.

Form of Usage

The input-output system 110 according to the second embodiment is configured as above. Next, the form of usage of the input-output system 110 will be described with reference to FIG. 11 and FIG. 12.

Figure 11:
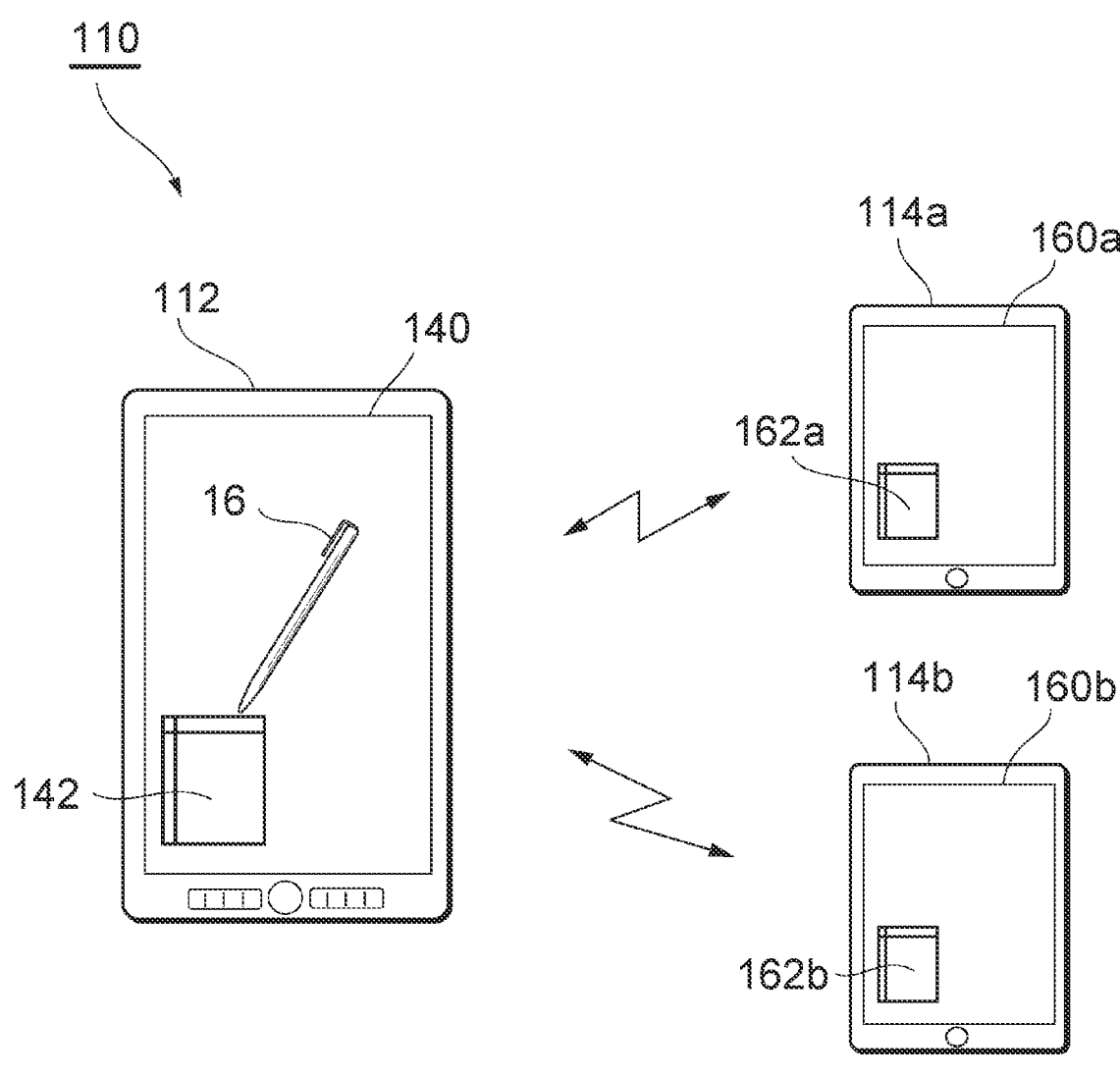
FIG. 11 is a diagram illustrating a first example of a form of usage of the input-output system of FIG. 8.

FIG. 11 is a diagram illustrating a first example of the form of usage of the input-output system 110 of FIG. 8. In the example of this diagram, it is assumed that collective setting of software is executed for multiple guest devices 114. In this case, the user of the host device 112 is a system administrator, and the users of the guest devices 114 are members of an organization.

After confirming that the host device 112 is in the state in which it can communicate with each guest device 114, the system administrator starts the setting of software by using the host device 112. Specifically, the system administrator uses the electronic pen 16 to execute an operation of touching a predetermined position in a display region 140 of the host device 112. As a result, a window 142 used for the setting appears in the display region 140 on the host side. In conjunction with this, the multiple guest devices 114 are remotely operated to follow the operation of the electronic pen 16. That is, a window 162*a* appears at a corresponding position in a display region 160*a* of the guest device 114*a*, and a window 162*b* appears at a corresponding position in a display region 160*b* of the guest device 114*b*.

Then, the system administrator executes a series of GUI operations for the host device 112, and thus, the setting of software can collectively be executed for not only the host device 112 but also the multiple guest devices 114 simultaneously connected to the host device 112. This collective setting can significantly save the user the trouble of performing a manual operation.

Figure 12:
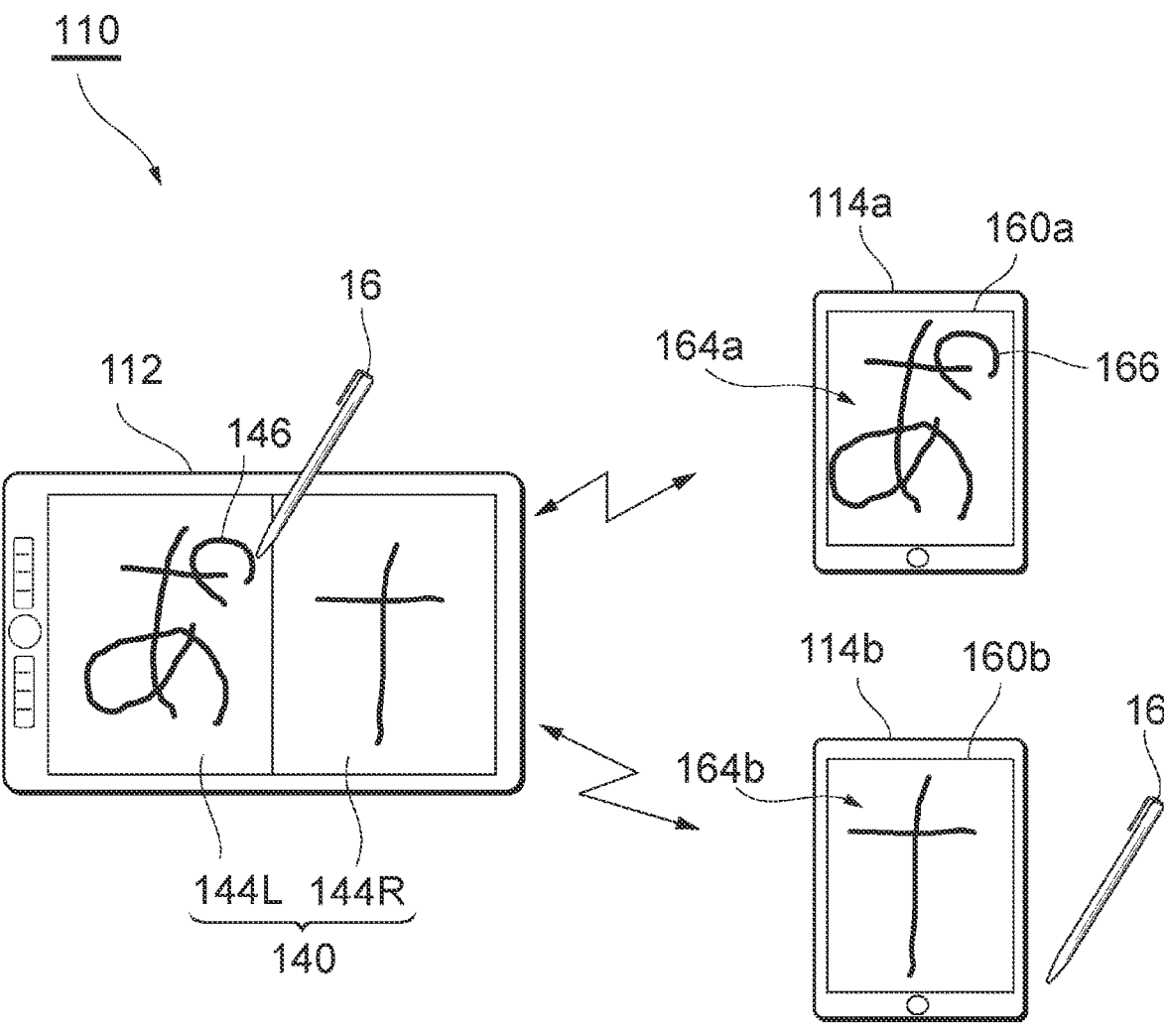
FIG. 12 is a diagram illustrating a second example of a form of usage of the input-output system of FIG. 8.

FIG. 12 is a diagram illustrating a second example of the form of usage of the input-output system 110 of FIG. 8. In the example of this diagram, it is assumed that an online lesson is held between a teacher and multiple students. In this case, the user of the host device 112 is the teacher, and the user of the guest device 114*a(b)* is the student.

First, each student practices writing a character or a picture by using his or her own guest device 114. Specifically, the student executes a hand writing operation in the display region 160*a(b)* of the guest device 114*a(b)* by using the electronic pen 16. Accordingly, a stroke group 164*a* is displayed in the display region 160*a*, and a stroke group 164*b* is displayed in the display region 160*b*. The degree of progression of practice often differs between students depending on their characteristics and the degree of proficiency in the operation.

Meanwhile, in the display region 140 of the host device 112, images currently displayed by the multiple guest devices 114 are multi-displayed as in the case of the first embodiment (display screen 52 in FIG. 4). Specifically, an image currently displayed by the guest device 114*a* is displayed in a sub-region 144L on the left side, and an image currently displayed by the guest device 114*b* is displayed in a sub-region 114R on the right side.

The teacher sequentially checks the practice status of each student while viewing the display region 140 on the host side. For example, when a student A has finished writing a character, the teacher executes an operation of writing an annotation 146 such as a circle mark in the sub-region 144L on the host side by using the electronic pen 16. In conjunction with this, an annotation 166 appears only in the display region 160*a* of the guest device 114*a* in such a manner as to follow the operation of the electronic pen 16. In contrast, the annotation 166 does not appear in the display region 160*b* of the guest device 114*b*. In this manner, the teacher can execute individualized coaching (for example, correction, advice, or the like) for each student. Alternatively, it is also possible for the teacher to simultaneously provide the same coaching (for example, summary, comment, model answer, or the like) to multiple students by executing the operation described with FIG. 11.

Effects Produced by Second Embodiment

As described above, the input-output system 110 according to the second embodiment includes the multiple guest devices 114 each configured to be capable of displaying an image in the display region 160*a(b)* on the guest side and the host device 112 configured to be capable of displaying an image in the display region 140 on the host side and to be capable of communicating with each guest device 114.

The host device 112 acquires the indicated position in the display region 140 on the host side and transmits, to each guest device 114, the relative coordinate value which is obtained by normalizing the first coordinate value representing the indicated position on the host side. The guest device 114 uses the display region information relating to the display region 160*a(b)* on the guest side to convert the relative coordinate value received from the host device 112, thereby calculating the second coordinate value representing the indicated position in the display region 160*a(b)* on the guest side.

As above, the host device 112 transmits, to each guest device 114, the relative coordinate value which is obtained by normalizing the first coordinate value. This allows the guest device 114 to obtain the corresponding indicated position on the guest side (that is, second coordinate value) without acquiring display information on the host side. This makes it possible to execute input-output processing with higher convenience in conjunction with the multiple guest devices 114.

Further, the guest device 114 may be configured to be capable of setting whether or not to use the relative coordinate value received by the guest device 114 itself or the second coordinate value calculated by the guest device 114 itself, for information processing. For example, when setting is made in such a manner that the relative coordinate value or the second coordinate value is not to be used, the guest device 114 may detect the indicated position on the guest side and use the indicated position on the guest side for the information processing.

In addition, the host device 112 may be configured to be capable of setting whether or not to transmit the relative coordinate value to the guest device 114. For example, when the relative coordinate value is not transmitted from the host device 112, the guest device 114 may detect the indicated position on the guest side and use the indicated position on the guest side for the information processing.

Further, the information processing may be the GUI operation. For example, collective setting of software is enabled, and the trouble of manual operation is thus significantly saved.

Moreover, the information processing may be processing of electronically executing rendering in the display region 160*a(b)* on the guest side. With this, for example, when an online lesson is held between a teacher and multiple students, coaching and advising with high convenience for the teacher can be executed.

It should be understood by those skilled in the art that various modifications, combinations, sub-combinations and alterations may occur depending on design requirements and other factors insofar as they are within the scope of the appended claims or the equivalents thereof.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A host device comprising:

a display device that, in operation, displays an image in a host display region;

a communication device that, in operation, communicates with multiple guest devices each having a display function; and a processor that, in operation, divides the host display region into at least two sub-regions and controls the display device to display at least two images currently displayed by at least two of the guest devices simultaneously connected to the host device, such that the at least two images are respectively displayed in corresponding ones of the at least two sub-regions, wherein the processor, in operation, selectively gives an execution right to a first one of the at least two of the guest devices, wherein the execution right enables the first one of the at least two of the guest devices to remotely execute a graphical user interface operation on the display device of the host device, wherein, in response to receiving the graphical user interface operation from the first one of the at least two of the guest devices to which the processor has given the execution right, the processor performs the graphical user interface operation on the display device of the host device, wherein the graphical user interface operation is a drag and drop operation that moves an icon in a first sub-region corresponding to the first one of the at least two of the guest devices into a second sub-region corresponding to a second one of the at least two of the guest devices, and wherein, when accepting the drag and drop operation from the first one of the at least two of the guest devices, the processor changes the host display region of the display device based on the drag and drop operation and transfers a data file corresponding to the icon from the first one of the at least two of the guest devices to the second one of the at least two of the guest devices via the communication device.

2. The host device according to claim 1, wherein:

the processor, in operation, controls the display device to change at least one of a position of each of the at least two sub-regions, a size of each of the at least two sub-regions, a number of divisions of the at least two sub-regions, and a combination of at least two of the guest devices in response to a switching operation made by a user.

3. The host device according to claim 1, wherein:

the communication device, in operation, receives, from any one of the at least two of the guest devices, a relative coordinate value that is obtained by normalizing an individual coordinate value representing an indicated position in a guest display region of the one of the at least two of the guest devices.

4. The host device according to claim 3, wherein:

the processor, in operation, calculates an indicated position in the host display region using display region information relating to the at least two sub-regions and converts the relative coordinate value received from the one of the at least two of the guest devices.

5. The host device according to claim 1, wherein:

the processor, in operation, switches to a duplication mode in which an image currently displayed by any one of the at least two of the guest devices is duplicated and displayed, or an expansion mode in which the image is displayed with expansion of a guest display region, in response to a switching operation made by a user.

6. The host device according to claim 5, wherein:

the processor, in operation, performs information processing relating to display of the image, in execution of the duplication mode or the expansion mode.

* * * * *